United States Patent [19]

Van Buskirk et al.

[11] Patent Number: 4,942,193

[45] Date of Patent: Jul. 17, 1990

[54] TEMPORARY PROTECTIVE COATING COMPOSITIONS

[75] Inventors: Ellor J. Van Buskirk; Rudolf Maska, both of Pittsburgh, Pa.

[73] Assignee: PPG Industries, Inc., Pittsburgh, Pa.

[21] Appl. No.: 255,286

[22] Filed: Oct. 11, 1988

[51] Int. Cl.$^5$ .................. C08L 91/06; C08L 91/08
[52] U.S. Cl. .................................. 524/276; 524/275; 524/277; 524/279; 524/487; 524/488; 524/489
[58] Field of Search ............... 427/156; 524/277, 487, 524/275, 276, 488, 489, 279; 428/161, 163, 484

[56] References Cited

U.S. PATENT DOCUMENTS

| | | | |
|---|---|---|---|
| 4,013,607 | 3/1977 | Dwyer et al. | 260/29.6 H |
| 4,168,255 | 9/1979 | Lewis et al. | 524/277 |
| 4,289,671 | 9/1981 | Hernandez | 260/28.5 AV |
| 4,317,755 | 3/1982 | Gregory | 524/276 |
| 4,390,436 | 6/1983 | Hernandez | 252/49.3 |
| 4,540,736 | 9/1985 | Herten et al. | 524/556 |
| 4,562,226 | 12/1985 | Coombes et al. | 524/767 |
| 4,693,909 | 9/1987 | Ziegler et al. | 427/156 |
| 4,826,902 | 5/1989 | Hanabata et al. | 524/524 |

FOREIGN PATENT DOCUMENTS 2158831A 11/1985 United Kingdom .

*Primary Examiner*—Allan M. Lieberman
*Attorney, Agent, or Firm*—Godfried R. Akorli

[57] ABSTRACT

A formable, weldable, temporary protective coating for use on metals, said coating comprising a base-neutralized acid or base-functional copolymer which contains wax.

6 Claims, No Drawings

TEMPORARY PROTECTIVE COATING COMPOSITIONS

BACKGROUND OF THE INVENTION

The present invention relates to temporary protective coating compositions which are useful in passivating untreated metallic substrates. More specifically, the invention relates to aqueous temporary protective coating compositions comprising addition polymers and waxes which are useful as mill passivating compositions.

BRIEF DESCRIPTION OF THE PRIOR ART

Passivation of metals in mills is done in the main with mill oils or chemical treatments in order to prevent or reduce corrosion, particularly white rust. The shortcoming of mill oils is the difficulty in removing them effectively and the less than desired corrosion protection provided thereby. The shortcoming of chemical treatments, particularly those involving film-forming materials, is their incompatibility with materials and processes that are subsequently applied to the subject substrate.

Art-related protective coating compositions comprising alkali-soluble carboxyl group-containing polymers and/or waxes are known in the art. Most of these compositions are employed distinctly on painted or polished surfaces and are less effective on untreated metallic substrates.

In contrast, the protective coating compositions which are of interest here should be suited to the application to bare metallic substrates. Additionally, these protective coating compositions should be compatible with subsequently applied pretreatment compositions, they should be formable, weldable, and removable with an aqueous alkaline solution, and they should be able to prevent or reduce corrosion, particularly in the form of white rust. These types of temporary protective coating compositions are hereby provided.

SUMMARY OF THE INVENTION

In accordance with the foregoing, the present invention encompasses: a formable, weldable aqueous temporary protective compositions for a metallic substrate, said composition comprises in combination a neutralized acid- or base-functional polymer and a lubricating composition consisting essentially of a relatively high amount of wax, i.e., an amount sufficient to provide drawability and formability, of the metallic substrate to which it was applied.

In the present embodiment of the invention, there is employed herein a base-neutralized acid-functional polymer. The acid-functional polymer in combination with a wax is prepared by copolymerization of ethylenically unsaturated monomers, at least one of which is acid functional, in a solvent, in the presence of a wax such as hydrocarbon wax. The resultant composition is dispersed in water in the presence of a base such as ammonium hydroxide.

When applied as a passivating agent, the protective coating compositions, in the preferred embodiment, are found to produce coatings which are corrosion resistant, drawable, formable, weldable, and easily removable with an aqueous alkaline or acidic solution.

The term "formable" or "formability" is defined as the ability of a coated sheet of metal to be bent without creating substantial cracks or voids in the film. The term "drawable" or "drawability" is defined as the ability to stamp a coated sheet of metal into a curved three-dimensional shape without substantially breaking the sheet and without significant damage to the coated sheet of metal. The term "weldable" or "weldability" is defined as the ability to perform spot welds on a coated sheet of metal using conventional spot welding tips and pressures. As would be realized, the above properties can be affected by the nature of the selected sheet of metal. At any rate, the protective coating compositions of this invention show remarkable improvement in the aforestated properties.

DETAILED DESCRIPTION OF THE INVENTION

The aqueous temporary protective coating compositions of this invention, in the preferred embodiment, are characterized as being drawable, formable, weldable, and easily removable with an aqueous alkaline solution. These and other aspects of the claimed protective coating compositions are described more fully below.

The acid- or base-neutralized, functional polymers that are employed herein has a Tg of about $-30°$ C. to $100°$ C. and preferably about $-15°$ C. to $30°$ C., and a weight average molecular weight of about 3,000 to 90,000 and preferably about 5,000 to 30,000. Typically, the polymer is a solution polymerized free-radical addition polymer. The polymers can be acid or base functional. In accordance with this invention, the acid-functional polymer can be prepared by polymerizing in a solvent medium, ethylenically unsaturated monomers at least one of which is an acid-functional monomer. Examples of the acid-functional monomers can be acrylic acid, methacrylic acid, crotonic acid, itaconic acid, maleic acid, and the like. Amounts of about 5 to 100 percent by weight of the acid-functional monomer based on the total monomer content can be employed. Typically, amounts of about 10 to 40 and preferably about 10 to 30 percent by weight are employed. Copolymerizable ethylenically unsaturated monomers such as vinyl monomers, e.g., styrene, vinyl toluene and the like, esters of acrylic or methacrylic acid, such as methyl methacrylate, butyl acrylate, and 2-ethylhexylacrylate, can be employed.

The base-functional polymer can be prepared by polymerizing in a solvent medium ethylenically unsaturated monomers at least one of which is a base-functional monomer. Examples of the base-functional monomers can be amino alkyl(meth)acrylate, t-butyl aminoethyl(meth)acrylate, diisobutylaminoethyl(meth)acrylate, and dimethyl aminoethyl(meth)acrylate. Amounts of about 1 to 50 and preferably about 5 to 20 of the base-functional monomers are employed.

The lubricant composition useful herein consists essentially of wax. The wax is believed to impart the property of drawability to the protective coating compositions. Typically, the wax has a melting point of about $140°$ F. Suitable waxes include hydrocarbon and/or ester containing waxes of varying melting points and grades, e.g., polyethylene. petrolatum wax, bees wax, carnauba wax and a mixture thereof. Amounts of wax ranging from about 5 to 70 and preferably about 10 to 30 percent by weight, based on the total weight of the wax and polymer are employed herein. The lubricant composition may contain additives such as silicone fluids, molybdenum disulfide, graphite, hydrocarbon oils, vegetable oils, fatty acids, and resins. In the preferred embodiment wherein the addition polymer is prepared in the presence of the wax, it is believed, without being bound thereby, that a graft of the wax and the polymer are thereby formed. It should, however, be realized that a polymer can be made in the absence of wax and then employed in combination with a wax, preferably in the form of a powder or liquid.

In a particularly preferred embodiment of the invention, graphite or an equivalent thereof, is employed as an additive that enhances conductivity of the applied protective coating compositions during welding. These additives are usually employed in the form of particulates. They are employed in amounts sufficient to effect welding of films of a relatively higher thickness. In the context of this invention, it would be preferable to employ these additives in films of thickness of about 1.5 milligrams per square inch or higher.

The protective coating compositions can be prepared by thinning the wax-containing acid- or base-neutralized solution polymer in water to a conducive application viscosity. This can be done by at least partially neutralizing the functional polymer. Neutralization can be conducted before or during the thinning. Volatile neutralizing agents are preferred. By the term "volatile", it is meant that the neutralizing agent leaves the applied coating when it is dried or baked. For an acid-functional polymer, neutralization is affected with a base. Illustrative examples of the bases can be ammonia, including ammonium hydroxide, primary or secondary amines, e.g., ethanolamine, diethanolamine, N-methylethanolamine, dimethylethanolamine, methylamine, ethylamine, triethylamine and morpholine. For a base-functional polymer, neutralization can be affected with an organic or inorganic acid such as acetic acid, lactic acid, phosphoric acid or the like.

Additives, such as defoamers, wetting agents, or additional cosolvents, may be employed herein. It is a distinct feature of this invention that the protective coating compositions are free of or substantially free of an external surfactant which can cause water sensitivity and poor corrosion resistance.

In the practice of the invention, the protective coating compositions can be applied to metallic substrates by a conventional method such as spraying, brushing, dipping, roller coating, curtain coating or the like. Coating weights of about 0.3 to 4, preferably about 0.5 to 3, and more preferably about 1.0 to 2.0 milligrams per square inch can be applied. It would, of course, be realized that substrates with a different surface roughness and porosity may require a different film thickness of the applied protective coating compositions. The applied coatings are air dried or forced dried or baked in a remarkably short period of time. The resultant coatings have been found to be block resistant, i.e., the coated substrates are resistant to sticking together when stacked.

Removal of the applied coatings are easily effected by contacting the coated substrate with an aqueous alkaline or acidic solution. Contacting means such as spraying, flooding, dipping (immersion) or the like can be employed. It is noteworthy that in actual production practice, conventional lubricants are not satisfactorily removed from inside, enclosed portions of a manufactured article which are not subject to the direct impingement of sprayed cleaners. The coating compositions of this invention can remarkably improve the corrosion resistance of manufactured articles. In essence, the complete removability of the coatings from enclosed areas by immersion enables proper pretreatment of all areas of an article. Consequently, adhesion of subsequently applied paint layers is significantly improved. The concentration of the solution will depend on the nature of the particular alkali or acidic solution, the temperature of removal, and the degree of neutralization by the solution. With the protective coatings removed therefrom, the substrate can be used as such, or subjected to other coating processes such as conversion coating.

It is a distinct feature of the invention that the protective coatings of this invention can be removed effectively by immersion cleaning.

Since it is relatively easy to remove the protective coating compositions of this invention, it is believed that the compositions may be employed by themselves or with mill oils applied thereon in relatively low amounts. The combination of the protective coatings will be removable, drawable, formable, weldable and corrosion resistant. With the combination of protective coatings removed therefrom, the substrate can be used without further treatment or subjected to subsequent coating processes.

The invention is further illustrated by the following non-limiting examples.

EXAMPLE IA

This example illustrates the preparation of a water-based acrylic resin containing wax.

A reaction vessel equipped with thermometer, stirrer, dropping funnels, reflux condenser and means for maintaining a blanket of nitrogen was charged at room temperature with a composition consisting of a mixture of 135 grams of butyl Cellosolve, 22.5 grams of butanol, and 101.3 grams of SHELLMAX (a petroleum wax having a softening point of about 60° C., available from Shell Oil Company). The composition was heated over a period of about 30 minutes to reflux. When the reflux temperature was attained, the simultaneous, gradual addition to the vessel of Charge A and Charge X were started and continued for three hours while maintaining reflux. Charge A consisted of a mixture of 317.2 grams of butyl acrylate, 202.5 grams of styrene, 135.0 grams of acrylic acid, 20.3 grams of diethyl aminoethyl methacrylate, and Charge X consisted of a mixture of 6.8 grams of butyl Cellosolve and 20.3 grams of t-butyl perbenzoate. When the addition of Charges A and X were completed at 150° C., Charge B comprising 2.3 grams of butyl cellosolve plus 2.3 grams of t-butyl perbenzoate was added and the reaction mixture was held for two hours. Charge C comprising 2.3 grams of t-butyl perbenzoate and 2.3 grams of butyl cellosolve was added at 141° C. and the reaction mixture was held for one hour. The reaction mixture was then cooled to 79° C. (A 50/50 resin/M-pryol mixture had a Z-5 Gardner-Holdt viscosity at 41.1 percent solids.) Feed D comprising 112.5 grams of deionized water and 107.1 grams of ammonium hydroxide was added over 15 minutes and held for 15 minutes. Feed E comprising additional 1968.0 grams of deionized water was added to the reaction mixture for 1.5 hours at 72° C. Analysis: Milliequivalents of acid was 0.429, milliequivalents of base was 0.453, weight average molecular weight (Mw) was 10,924, viscosity was 4320 centipoise (Brookfield No. 4 spindle) at 20 revolutions per minute (RPM), pH was 9.30 and percent solids was 22.9 (measured at 110° C. for two hours).

EXAMPLE IB

This example further illustrates the preparation of the water-based acrylic polymer containing wax. The following were used in the preparation:

| Ingredients | Parts by Weight |
|---|---|
| Reactor Charge | |
| Butyl Cellosolve | 140.0 |
| Butanol | 23.3 |
| SHELLMAX | 483.0 |
| Charge X | |
| Butyl Cellosolve | 7.00 |
| t-Butyl perbenzoate | 9.7 |
| Charge A | |
| Acrylic acid | 322.0 |
| 1 Dodecanethiol | 4.8 |
| Charge B | |
| Butyl Cellosolve | 2.4 |
| t-butyl perbenzoate | 2.4 |
| Charge C | |
| Butyl Cellosolve | 2.4 |
| t-butyl perbenzoate | 2.4 |
| Charge D | |
| Deionized water | 117.0 |
| Ammonium hydroxide | 271.1 |
| Charge E | |
| Deionized water | 2040 |

A reaction vessel equipped with thermometer, stirrer, dropping funnels, reflux condenser and means for maintaining a blanket of nitrogen was charged at room temperature with a composition consisting of the reactor charge. The composition was heated over a period of about 30 minutes to reflux. When the reflux temperature was attained, the simultaneous, gradual addition to the vessel of Charge A and Charge X was started and continued over three hours while maintaining reflux. When the addition of Charges A and X were completed at 135° C., Charge B was added and the reaction mixture was held for two hours. Charge C was added at 125° C. and the reaction mixture was held for one hour. The reaction mixture was then cooled to 80° C. (resin solids was 82.2 Percent). Feed D was added into the reaction mixture for over 15 minutes and held for 15 minutes. Feed E was added to the reaction mixture over 1.5 hours at 72° C. Analysis: Milliequivalents of acid was 0.921, milliequivalents of base was 0.805, weight average molecular weight was 1410, viscosity was 465 centipoise (Brookfield No. 4 spindle) at 20 RPM, pH was 7.10 and percent solids was 26.8 percent (measured at 110° C for two hours).

EXAMPLE II

The water-based acrylic polymer of Example I was thinned to 12 percent solids with water and flow coated over freshly cleaned electrogalvanized panels. After air drying for 15 minutes until tack-free, the panels were force dried for 5 minutes at 105° C. A film weight of 0.8 to 0.9 milligrams per square inch resulted.

EXAMPLE III

The water-based acrylic polymer of Example IB was thinned to 20 percent solids, applied by a No. 6 wirewound drawbar to a freshly cleaned electrogalvanized panel, baked for 50 seconds at 550° F. to a peak metal temperature of 420° F. and quenched. A film weight of 1.1 milligrams per square inch resulted. This coated sheet was immersed in a commercial alkaline cleaner for one minute at 140° F. and rinsed for 30 seconds in hot tap water. A clean, water break-free panel resulted, indicating a high degree of cleanliness.

COMPARATIVE EXAMPLE I

As an experimental control for the panels of Example II, freshly cleaned electrogalvanized panels were coated with a commercially available mill oil which is supplied to protect galvanized and other steels from corrosion. Quaker 61A-US oil, available from Quaker Chemical Company, was applied by putting two drops on a 4×12-inch panel and rubbing with the finger of a clean white cotton glove which had been soaked in the same oil. A film weight of 0.6 to 0.8 milligrams per square inch resulted, which is higher than the approximately 0.4 milligrams per square inch of oil found on commercially available electrogalvanized steel as shipped.

EVALUATION

HUMIDITY CORROSION TEST

Panels from Example II and the Comparative Example I were stacked together, clamped, and stored in a humidity cabinet for one week at 100 percent relative humidity and 115°±5° F.

After removal from the humidity cabinet, the test panels from Example II were cleaned by immersion in a one percent solution of an alkaline cleaner for 30 seconds at 150° F. The cleaner, CHEMKLEEN 49, is available from Chemfil Corporation. After rinsing, the panels were "water break free" indicating a high degree of cleanliness. When these humidity-tested panels were compared visually to untested panels cleaned in the same way, there was little, if any, color change apparent in the humidity-tested panels. The lack of color change indicated that very little oxidation of the zinc layer had taken place.

After removal from the humidity cabinet, panels from the Comparative Example I (mill oil) were immersed for three minutes in the same one percent solution of alkaline cleaner. After rinsing, water beaded up on the panels indicating that the panels were not clean. After solvent wiping and additional immersion cleaning for 30 seconds, the panels were water break free and judged to be clean. When these humidity-tested panels were compared visually to untested panels (which were cleaned in the same manner), it was found that the humidity-tested panels were significantly darker than the untested panels. A gray swirling pattern indicated that significant oxidation of the zinc had occurred.

EXAMPLE IV

To test the drawability and lubricity of the protective coating composition of Example II, additional electrogalvanized panels were coated by the same method as in Example II. Approximately 1.0 to 1.1 milligrams per square inch of coating resulted.

COMPARATIVE EXAMPLE II

As an experimental control for Example IV, a commercially available waterborne drawing lubricant, Pillsbury FB-27MC, was applied to freshly cleaned electrogalvanized panels. Eighteen drops of the FB-27MC lubricant were distributed over a 5×13-inch panel area with the finger of a clean cotton glove which was soaked in the same lubricant and allowed to dry. Approximately 0.6 milligrams per square inch of lubricant resulted.

FABRICATION TEST

To test drawability and formability (fabrication) and cleanability, panels from Example IV and Comparative Example II were drawn into square cups one inch in height and 1 7/16 inches along each side. One area on the sides of the cups was deformed to a major strain of +20 percent and a minor strain of −12 percent. Another area on the sides of the cups was deformed to a major strain of +60 percent and a minor strain of −35 percent. The cup's corners were deformed to a major strain of +160 percent and a minor strain of −40 percent. Panels from Example IV, temporary coating compositions were fabricated dry with no additional lubricant. Panels from Comparative Example II coated with a drawing lubricant were additionally smeared with an excess of fluid FB-27MC lubricant before forming into the cup shape.

After being drawn into cups, the panels from Example IV, temporary coating composition, showed a uniform film over the entire square cup. Only minimal galling of the zinc substrate was noted at the corners of the drawn cups. A few scratches were noted on the sides of the cups. After cleaning by immersion in a one percent solution of CHEMKLEEN 49 for one minute, at 150° F. and rinsing, a completely clean "water break free" formed part resulted.

After being drawn into cups, the panels from Comparative Example II, waterborne drawing lubricant, showed a heavily galled and polished appearance on areas of all four sides of the cup. The galling and polishing of these areas showed that the lubricant did not provide an effective fluid barrier between the stamping dye and the substrate. After cleaning one cup by immersion in a one percent solution of CHEMKLEEN 49 for one minute at 150° F. and rinsing, the rinse water beaded up on it indicating that the lubricant was not removed effectively.

It is concluded that in comparision to conventional drawing lubricants, the temporary coating compositions of Examples II and IV provide significantly better protection of the zinc surface from corrosion and fabrication. Yet, the protective coating compositions exceed the removability of conventional lubricants and thus allow the proper cleaning of formed parts.

WELDABILITY TEST

To study the spot-weldability of the protective coating compositions of this invention, protective coating compositions of various glass transition temperatures and applied film thicknesses were prepared. The weldability was tested by two methods. In the first method, coated sheets were continuously spot-welded for at least 500 spot welds while observing whether the welding electrodes became coated with an insulating, current-insulating char, or whether they remained clean enough to conduct approximately 10,000 amps necessary for spot welding.

In the second method, the coating's ability to be penetrated by spot welding electrodes during a small number of welds was tested. Electrodes which had been degraded to some extent by continuous welding were used. When approximately 10,000 amps could be passed through the electrodes and the coated sheet, the welding was considered successful. When a loud cracking sound was heard, accompanied by black charring of the surrounding coating, but approximately 10,000 amps still flowed through the sheet, the spot welding was judged to be marginally acceptable. When the welding electrodes squeezed the panels together in the usual manner and no current flowed because of excessive electrical resistance, the spot welding was judged to be unacceptable. When some welds occurred normally with a current flow of approximately 10,000 amps, but some welds were unsuccessful because of excessive electrical resistance, the weldability was judged to be barely weldable.

A pedestal-type spot-welding machine with a maximum electrical output of 22,000 amps at 6 volts was used for the welding tests. The machine used was a Model 150AP, available from Lors Corporation of Union, New Jersey. The electrodes squeezed the two sheets to be welded together with a force of 525 pounds which was a conventional, recommended squeezing force for spot welding two 0.030-inch galvanized steel panels.

EXAMPLE V

The water-based polymer of Example I was thinned to 12 percent solids with water and flow coated onto both sides of freshly cleaned electrogalvanized steel sheets, air dried until tack free, and forced dried for five minutes at 105° C. A film weight of 0.96 to 1.37 milligrams per square inch resulted. After making 750 spot welds on these sheets, the welding electrodes were still able to conduct approximately 10,000 amps through additional coated sheets. During the 750 weld test, occasional charring of the coating was noted on the side of the panels with the thicker coating weight of 1.3 milligrams per square inch, but no charring was noted on the area of the panels having about 1.0 milligrams per square inch of coating. Approximately 10,000 amps passed through each spot weld of the 750 weld test. The spot weldability of this particular coating was judged to be acceptable at about 1.0 milligrams per square inch and marginally acceptable at about 1.3 milligrams per square inch.

It was surprising and unexpected that the coating-lubricant of this invention flowed away from the spot-welding electrodes under continual exposure to pressure and heat and that a progressive buildup of current insulating char did not occur.

EXAMPLE VI

The worn and degraded welding electrodes from the first welding test in Example V was used in the second welding test method which tests coating-lubricant's ability to be penetrated by spot-welding electrodes when using a conventional amount of squeezing force.

The following table shows protective compositions of various glass transition temperatures which were tested for welding electrode penetration.

TABLE I

| Polymer | Tg | % Butyl Acrylate | Styrene | % Acrylic Acid | % Dimethyl aminoethyl Methacrylate | % Wax |
|---|---|---|---|---|---|---|
| A | 5° C. | 47 | 30 | 20 | 3 | 15 |
| B | −11° C. | 60 | 20 | 20 | — | 15 |

TABLE I-continued

| Polymer | Tg | % Butyl Acrylate | Styrene | % Acrylic Acid | % Dimethyl aminoethyl Methacrylate | % Wax |
|---|---|---|---|---|---|---|
| C | −27° C. | 73 | 7 | 20 | — | 15 |

The electrode penetration test yielded the following weldability results at the film weight stated in Table II, hereinbelow:

TABLE II

| Polymer | Tg | Milligrams per Square Inch | Electrode Penetration Test |
|---|---|---|---|
| A | +5° C. | 1.0 | Acceptable |
| A | +5° C. | 1.3 | Marginally acceptable |
| B | −11° C. | 1.4 | Acceptable |
| B | −11° C. | 1.84 | Marginally acceptable |
| B | −11° C. | 2.58 | Barely weldable |
| C | −27° C. | 2.12 | Acceptable |
| C | −27° C. | 2.97 | Marginally acceptable |
| C | −27° C. | 5.5 | Barely weldable |

OTHER PROPERTIES OF THE PROTECTIVE COATING COMPOSITIONS

Additional properties desired of temporary protective coating compositions are flexibility, and resistance to "blocking" or sticking together when the coated substrates are stacked.

Flexibility

To test flexibility, electrogalvanized steel sheets coated with the protective coating compositions of this invention were bent to a radius of 0.075 inches to what is called a "5T" bend, i.e., the coated sheet was bent over five thicknesses of the same sheet. The bent pieces were then immersed in a five-percent Cupric Nitrate (Cu(NO$_3$)$_2$) solution for ten seconds and then rinsed. A copper-containing deposit would form on any area of exposed zinc metal. Cracks or porosity of the protective coating compositions on a bent area would be evidenced by a brown or black color after the test.

Coating-lubricants of the following composition were tested for flexibility:

TABLE III

| Polymer | Tg °C. | % Styrene | % Butyl Acrylate | % Acrylic Acid | % Dimethyl aminoethyl Methacrylate | % Wax | 5T Bend + CU(NO$_3$)$_2$ Test |
|---|---|---|---|---|---|---|---|
| D | 35 | 50 | 30 | 20 | — | 2 | Black deposit |
| E | 5 | 30 | 47 | 20 | 3 | 15 | Light gray deposit |
| F | −12 | 17 | 60 | 20 | 3 | 15 | No effect |

Block-resistance

To test the block resistance, substrates coated with the protective coating compositions of this invention were pressed together in a stack with a force of 150 pounds per square inch of coated sheet at 120° F. for 16 hours and then cooled. The stack of panels was then taken apart and the individual sheets tested for any film damage caused by the heat and pressure combined with any damage caused by separating the pieces, (referred to as "uncoiling pickoff"). To test film damage, the block-tested pieces were immersed in a five-percent Cupric Nitrate solution and rinsed, to observe any brown or black copper deposition at areas of extremely low film thickness, or at areas where the film has suffered from "pickoff" by adhering to another coated sheet during the block test.

The following protective coating compositions were tested at 1.4 to 1.5 milligrams per square inch of dry film on electrogalvanized steel:

TABLE IV

| Protective Coating Composition | Tg | % Butyl Acrylate | % Styrene | % Acrylic Acid | % Wax |
|---|---|---|---|---|---|
| G | −11° C. | 60 | 20 | 20 | 15 |
| H | −27° C. | 73 | 7 | 20 | 15 |

After the block test, coating composition H was found to have a dark dense copper deposition over most of the tested pieces indicating poor film integrity after exposure to heat, pressure, and sheet separation. After the block test, coating-lubricant G showed only a very slight copper deposition over the tested area, indicating that this film was still capable of protecting the underlying metallic surface from physical abuse and corrosion.

In addition to the properties of removability, drawability, and weldability, the protective compositions in certain embodiments can be flexible and block resistant. While the invention has been described and illustrated with particularity herein, it will be understood that various modifications will be apparent to one skilled in the art without departing from the scope or spirit of the invention. Accordingly, it is intended that the claims directed to the invention be construed as encompassing all aspects of the invention which would be treated as equivalents by those skilled in the art to which the invention pertains.

Therefore, what is claimed is:

1. An aqueous protective coating for a metallic substrate, said coating comprises a neutralized acid or base-functional copolymer and a lubricating composition consisting essentially of 5 to 70% by weight of a wax based on the total weight of said copolymer and said wax wherein the copolymer and wax are obtained in combination by free-radical addition polymerization of an acid or a base-functional ethylenically unsaturated monomer in a solvent in the presence of the wax.

2. The protective coating composition of claim 1 wherein the acid-functional monomer is present in an amount of about 5 to 100 based on total monomer composition.

3. The protective coating composition of claim 1 wherein the acid-functional polymer is base-neutralized with a volatile amine.

4. The protective coating composition of claim 1 wherein the wax is present in an amount of about 5 to 70 percent by weight based on total solids of the coating.

5. The protective coating composition of claim 4 wherein the wax is present in an amount of about 10 to 30 percent by weight.

6. The protective coating composition of claim 5 wherein the wax is hydrocarbon wax, carnauba wax, or bee wax.

* * * * *